United States Patent
Dale et al.

(10) Patent No.: US 10,319,987 B2
(45) Date of Patent: Jun. 11, 2019

(54) ACTIVE MATERIAL WITH EXPANSION STRUCTURE FOR USE IN LITHIUM ION BATTERIES

(71) Applicant: NISSAN NORTH AMERICA, INC., Franklin, TN (US)

(72) Inventors: Nilesh Dale, Novi, MI (US); Xiaoguang Hao, Wixom, MI (US)

(73) Assignee: Nissan North America, Inc., Franklin, TN (US)

( * ) Notice: Subject to any disclaimer, the term of this patent is extended or adjusted under 35 U.S.C. 154(b) by 491 days.

(21) Appl. No.: 14/975,896

(22) Filed: Dec. 21, 2015

(65) Prior Publication Data
US 2017/0179467 A1    Jun. 22, 2017

(51) Int. Cl.
| | |
|---|---|
| *H01M 4/133* | (2010.01) |
| *H01M 10/0525* | (2010.01) |
| *H01M 4/134* | (2010.01) |
| *H01M 4/38* | (2006.01) |
| *H01M 4/62* | (2006.01) |
| *H01M 10/052* | (2010.01) |

(Continued)

(52) U.S. Cl.
CPC .......... *H01M 4/133* (2013.01); *H01M 4/134* (2013.01); *H01M 4/386* (2013.01); *H01M 4/387* (2013.01); *H01M 4/625* (2013.01); *H01M 10/052* (2013.01); *H01M 10/0525* (2013.01); *H01M 4/366* (2013.01); *H01M 4/583* (2013.01); *H01M 4/587* (2013.01); *H01M 4/626* (2013.01); *H01M 2004/021* (2013.01); *H01M 2220/20* (2013.01); *Y02E 60/122* (2013.01)

(58) Field of Classification Search
CPC ...... H01M 4/133; H01M 4/387; H01M 4/134; H01M 4/386; H01M 10/0525; H01M 2220/20; H01M 2004/021; H01M 4/366; H01M 4/587; H01M 4/626; H01M 4/583; H01M 10/052
See application file for complete search history.

(56) References Cited

U.S. PATENT DOCUMENTS

| | | |
|---|---|---|
| 8,338,019 B2 | 12/2012 | Lee et al. |
| 8,669,008 B2 | 3/2014 | Cho et al. |

(Continued)

FOREIGN PATENT DOCUMENTS

| | | |
|---|---|---|
| CN | 103779570 A | 5/2014 |
| JP | 2003297353 A | 10/2003 |

(Continued)

OTHER PUBLICATIONS

Wang et al., "Nanostructured Hybrid Silicon/Carbon Nanotube Heterostructures: Reversible High-Capacity Lithium-Ion Anodes," 2010, ACS Nano, vol. 4, pp. 2233-2241. (Year: 2010).*

*Primary Examiner* — Ula C Ruddock
*Assistant Examiner* — Matthew W Van Oudenaren
(74) *Attorney, Agent, or Firm* — Young Basile Hanlon & MacFarlane, P.C.

(57) ABSTRACT

An active material layer for an electrode of a lithium ion battery has a first active material comprising silicon-based particles, a second active material comprising graphite and conduits between the first active material and the second active material, the conduits being a conductive material and providing area for expansion of the first active material due to lithiation while maintaining contact between the first active material and the second active material.

14 Claims, 2 Drawing Sheets

(51) Int. Cl.
*H01M 4/02* (2006.01)
*H01M 4/36* (2006.01)
*H01M 4/587* (2010.01)
*H01M 4/583* (2010.01)

(56) References Cited

U.S. PATENT DOCUMENTS

| | | |
|---|---|---|
| 8,808,919 B2 | 8/2014 | Kim |
| 8,870,978 B2 | 10/2014 | Yun et al. |
| 8,974,966 B2 | 3/2015 | Kim et al. |
| 9,005,819 B2 | 4/2015 | Kwon et al. |
| 2007/0122711 A1* | 5/2007 | Takahashi ............... H01M 4/60 429/232 |
| 2007/0148550 A1 | 6/2007 | Hasegawa et al. |
| 2007/0178386 A1* | 8/2007 | Takeda ............... H01M 10/0569 429/331 |
| 2007/0264574 A1* | 11/2007 | Kim ....................... B82Y 30/00 429/231.8 |
| 2012/0219844 A1* | 8/2012 | Tsutsumi ............... H01G 11/06 429/153 |
| 2013/0032278 A1 | 2/2013 | Ottinger et al. |
| 2013/0260237 A1 | 10/2013 | Chang et al. |
| 2013/0330617 A1 | 12/2013 | Yoshimura et al. |
| 2014/0162131 A1* | 6/2014 | Friend ................. H01M 4/0492 429/231.8 |
| 2014/0234710 A1* | 8/2014 | Lee ....................... H01M 4/366 429/219 |
| 2014/0255742 A1 | 9/2014 | Kwon et al. |

FOREIGN PATENT DOCUMENTS

| | | |
|---|---|---|
| JP | 2005293960 A | 10/2005 |
| WO | 2009141691 A2 | 11/2009 |
| WO | WO2012175998 * | 12/2012 |
| WO | 2013021630 A1 | 2/2013 |

* cited by examiner

US 10,319,987 B2

ACTIVE MATERIAL WITH EXPANSION STRUCTURE FOR USE IN LITHIUM ION BATTERIES

TECHNICAL FIELD

This disclosure relates to an active material for use in an electrode having an expansion structures that maintain conductive contact between active material particles.

BACKGROUND

Hybrid vehicles (HEV) and electric vehicles (EV) use chargeable-dischargeable power sources. Secondary batteries such as lithium-ion batteries are typical power sources for HEV and EV vehicles. Lithium-ion secondary batteries typically use carbon, such as graphite, as the anode electrode. Graphite materials are very stable and exhibit good cycle-life and durability. However, graphite material suffers from a low theoretical lithium storage capacity of only about 372 mAh/g. This low storage capacity results in poor energy density of the lithium-ion battery and low electric mileage per charge.

To increase the theoretical lithium storage capacity, silicon has been added to active materials. However, silicon active materials suffer from rapid capacity fade, poor cycle life and poor durability. One primary cause of this rapid capacity fade is the massive volume expansion of silicon (typically up to 300%) upon lithium insertion. Volume expansion of silicon causes particle cracking and pulverization. This deteriorative phenomenon escalates to the electrode level, leading to electrode delamination, loss of porosity, electrical isolation of the active material, increase in electrode thickness, rapid capacity fade and ultimate cell failure.

SUMMARY

Disclosed herein are active material layers that provide a structure for expansion of high capacity alloying particles, the structure maintaining contact between active material particles through the life of the electrode. Also disclosed are electrodes and batteries utilizing the active materials.

An embodiment of the active material layer for an electrode of a lithium ion battery has a first active material comprising silicon-based particles, a second active material comprising graphite and conduits between the first active material and the second active material. The conduits are conductive and provide area for expansion of the first active material due to lithiation while maintaining contact between the first active material and the second active material.

An embodiment of an anode of a lithium ion battery includes a current collector, a separator and an active material layer between the current collector and the separator. The active material layer comprises first active material comprising alloying particles, second active material comprising a carbon material and conduits of a conductive material positioned between the first active material and the second active material. During lithiation, the first active material expands along the conduit toward the second active material. During delithiation, the first active material contracts along the conduit, the conduit providing continuous contact between the first active material and the second active material during lithiation and delithiation.

These and other aspects of the present disclosure are disclosed in the following detailed description of the embodiments, the appended claims and the accompanying figures.

BRIEF DESCRIPTION OF THE DRAWINGS

The invention is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

Figure 1A:
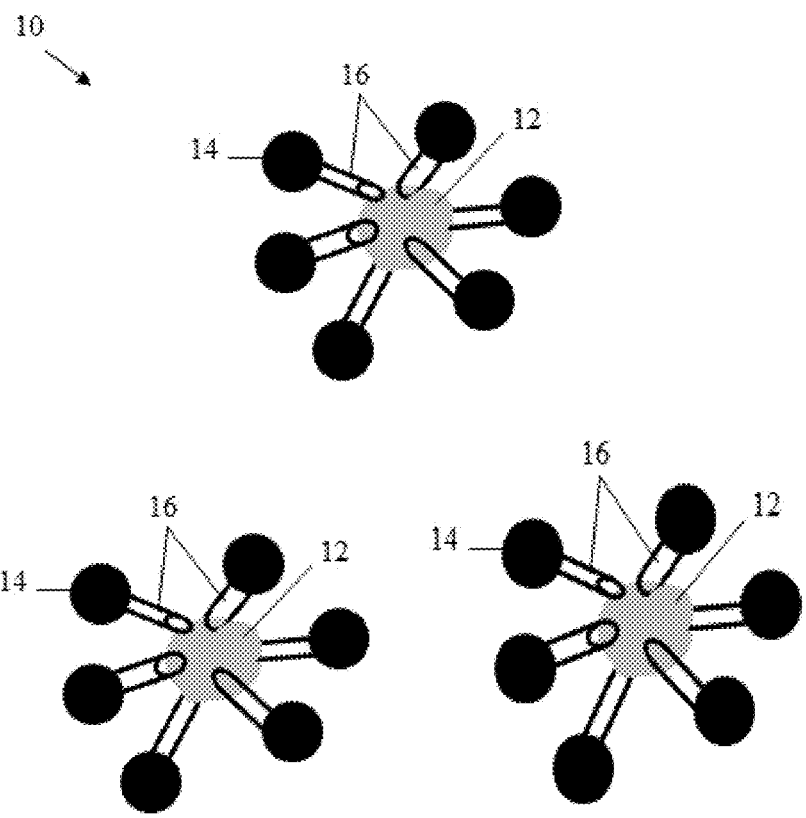
FIG. 1A illustrates an active material layer for an electrode as disclosed herein, the first active material in a delithiated state.

Because the carbon material used in electrodes of conventional batteries, such as lithium ion batteries or sodium ion batteries, suffers from a low specific capacity, the conventional battery has poor energy density even though there is small polarization and good stability. Furthermore, batteries having electrodes of graphite or other carbon materials develop increased internal resistance over time, which decreases their ability to deliver current.

To address the poor energy density of carbon based electrodes, alternative active materials with higher energy densities are desired. Alloying particles such as silicon, tin, germanium and their oxides and alloys are non-limiting examples of materials that may be added to an electrode active material layer to improve its energy density, among other benefits.

One particular example is the use of silicon in lithium-ion batteries. Electrode materials such as silicon react with lithium via a different mechanism than graphite. Lithium forms alloys with silicon materials, which involves breaking the bonds between host atoms, causing dramatic structural changes in the process. Since the silicon does not constrain the reaction, anode materials that form alloys can have much higher specific capacity than intercalation electrode materials such as graphite. Silicon based anode active materials have potential as a replacement for the carbon material of conventional lithium-ion battery anodes due to silicon's high theoretical lithium storage capacity of 3500 to 4400 mAh/g. Such a high theoretical storage capacity could significantly enhance the energy density of the lithium-ion batteries. However, silicon active materials suffer from rapid capacity fade, poor cycle life and poor durability. One primary cause of this rapid capacity fade is the massive volume expansion of silicon (typically up to 300%) and structural changes due to lithium insertion. Volume expansion of silicon can cause particle cracking and pulverization when the silicon has no room to expand, which leads to delamination of the active material from the current collector, electrical isolation of the fractured or pulverized active material, capacity fade due to collapsed conductive pathways, and increased internal resistance over time.

Disclosed herein are active material layers for use in electrodes and batteries. The active material of the active material layers includes alloying particles that have high capacity for lithium but undergo large volume expansions due to this high capacity. The active material further includes carbon material particles. The active material layers also include conductive conduits between the alloying material and the carbon material that provide structure along which the alloying material expands and contracts, the conductive conduits maintaining contact between the alloying material and the carbon material during repetitive expansion and contraction, reducing pulverization and fracturing of active material particles, and reducing electrical isolation and internal resistance over the life of the electrode.

Figure 1B:
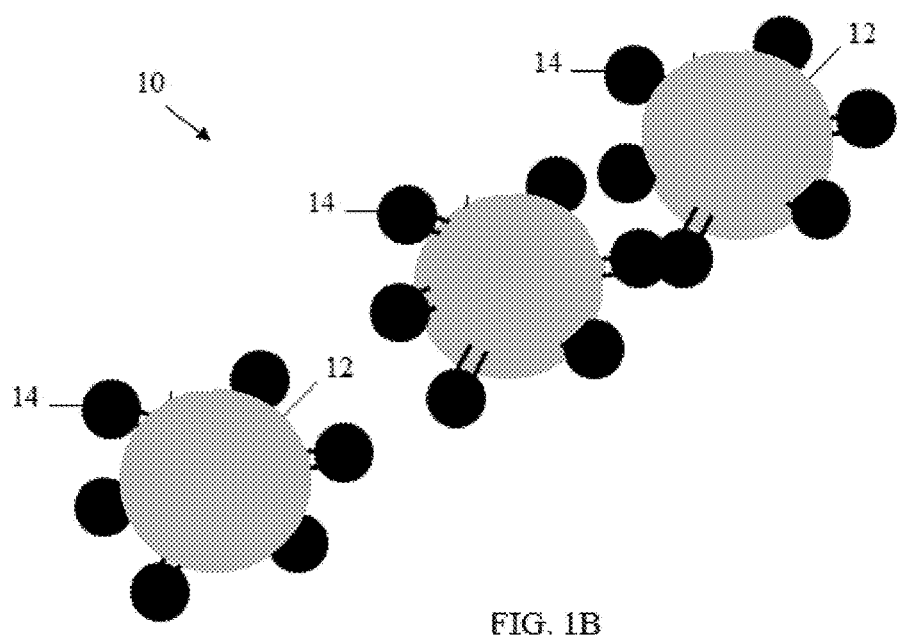
FIG. 1B illustrates the active material layer for an electrode of FIG. 1A with the first active material in a lithiated state.
Figure 4A:
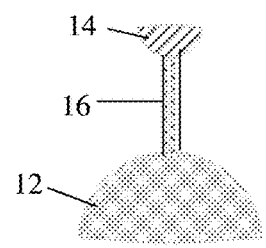
FIG. 4A is a partial enlarged cross section of the active material in a delithiated state.
Figure 4B:
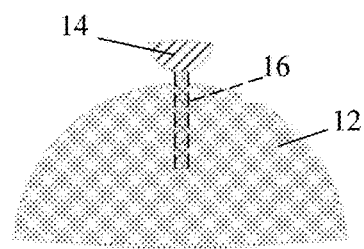
FIG. 4B is a partial enlarged cross section of the active material in a lithiated state.

An embodiment of the active material layer 10 for an electrode of a lithium ion battery is illustrated in FIGS. 1A and 1B. The active material layer 10 is comprised of first active material 12 comprising alloying particles and second active material 14 comprising a carbon material. The active material layer 10 further includes conduits 16 between the first active material 12 and the second active material 14. The conduits 16 are a conductive material and provide area for expansion of the alloying particles of the first active material 12 due to lithiation while maintaining contact between the first active material 12 and the second active material 14. FIGS. 4A and 4B are enlarged cross sectional views of the first active material 12 in an unexpanded or delithiated state. As illustrated in FIG. 4A, the conduit 16 maintains conductive contact between the first active material 12 and the second active material 14 when the second active material 14 is delithiated. As illustrated in FIG. 4B, as the first active material 12 expands due to lithiation, the first active material 12 expands into and around the conduit 16.

The alloying particles of the first active material 12 can be silicon-based or tin-based, for example. The silicon-based particles can be silicon, a silicon alloy, a silicon/germanium composite, silicon oxide and combinations thereof. The tin-based particles can be tin, tin oxide, a tin alloy and combinations thereof. Other high energy density materials known to those skilled in the art are also contemplated. The second active material 14 can include one or more of graphene, graphite, surface modified graphite, carbon nanotubes, carbon black, hard carbon, soft carbon and any other carbon materials known to those skilled in the art having the requisite electrochemical activity.

The ratio of first active material 12 to second active material 14 can be any ratio known to those skilled in the art to provide the requisite electrode capacity. The particle sizes of alloying particles in the first active material 12 and carbon-based particles in the second active material 14 can also be sizes that those skilled in the art would use in active material for an electrode. The sizes can vary within the active material layer 10 or can be uniform within the active material layer 10.

The conduits 16 are conducting tubes, nanotubes, or hollow wires that provide a conductive interface between the first active material 12 and the second active material 14. The conduits 16 can be a carbon material. An example of a material for use as the conduits 16 is carbon nanotubes. The carbon nanotubes can be single or multi-walled and can have any cross-sectional shape as desired or required. The conduits 16 can also be formed from conductive metal wires, and in particular, hollow wires, made of a material that does not react with lithium when used in a lithium based battery.

Figure 2:
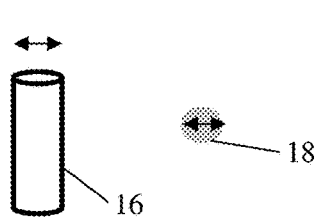
FIG. 2 illustrates the diameter of the conduit compared to the diameter of the alloying particle.

As illustrated in FIG. 2, the diameter of each conduit 16 is greater than a diameter of each alloying particle 18 in the first active material 12. The diameter of a conduit 16 can be, for example, fifty nanometers or greater. Each conduit 16 can have a length of up to thirty microns. The diameter and length of each conduit 16 can be uniform throughout the active material layer 10 or can vary throughout the active material layer 10.

The conduits 16 can be grown on or inserted into the first active material 12 as illustrated in FIGS. 1A and 1B. One example of growing carbon nanotubes on a silicon-based active material comprises mixing the carbon nanotubes with silicon gel such as tetraethyl orthosilicate gel or silicon dioxide gel to form a homogenous gel. The mixture is then spray dried and calcined in a furnace under a reducing atmosphere at about 1000° C. to about 1300° C. to form spheres of the active material with conduit grown on the spheres.

Figure 3A:
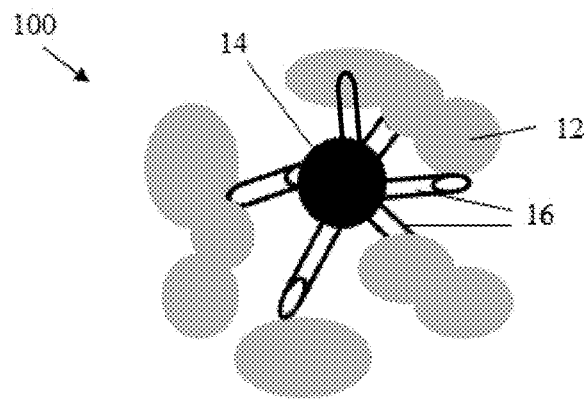
FIG. 3A illustrates another active material layer for an electrode as disclosed herein, the first active material in a delithiated state.
Figure 3B:
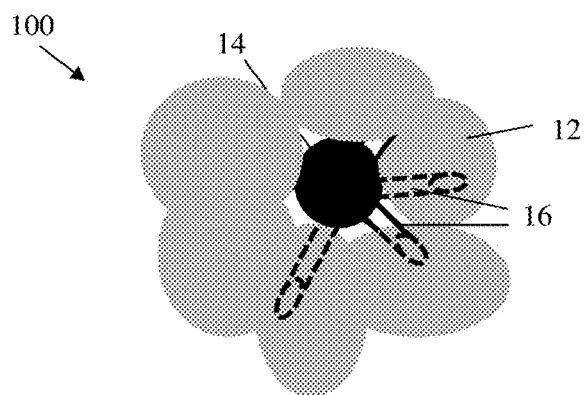
FIG. 3B illustrates the active material layer for an electrode of FIG. 3A with the first active material in a lithiated state.

Alternatively, the conduits 16 can be grown or inserted into the second active material 1 as illustrated in FIGS. 3A and 3B.

Also disclosed is an anode of a lithium-ion battery incorporating the active material layers 10 disclosed herein. The power generating element of the lithium-ion battery includes a plurality of unit cell layers each including a cathode active material layer, an electrolyte layer and the anode active material layer 10 disclosed herein. The cathode active material layer is formed on one surface of a current collector and electrically connected thereto and the anode active material layer 10 is formed on the other surface of the current collector and electrically connected thereto. Each of the electrolyte layers includes a separator serving as a substrate and an electrolyte supported by the separator.

Examples of the cathode active material layer may include lithium-transition metal composite oxides such as $LiMn_2O_4$, $LiCoO_2$, $LiNiO_2$, $Li(Ni-Co-Mn)O_2$, lithium-transition metal phosphate compounds, and lithium-transition metal sulfate compounds. These are provided by means of example and are not meant to be limiting. As the electrolyte constituting the electrolyte layer, a liquid electrolyte, a gel electrolyte or a polymer electrolyte known to those skilled in the art may be used. As examples, the liquid electrolyte may be in the form of a solution in which a lithium salt is dissolved in an organic solvent. The gel electrolyte may be in the form of a gel in which the above mentioned liquid electrolyte is impregnated into a matrix polymer composed of an ion conductive polymer. When the electrolyte layers are formed by a liquid electrolyte or gel electrolyte, a separator may be used in the electrolyte layer. Examples of the separators are porous films of polyolefin such as polyethylene and polypropylene. The current collector is composed of a conductive material serving as a joining member for electrically connecting the active material layers to the outside.

As described herein, the methods and systems include a series of steps. Unless otherwise indicated, the steps described may be processed in different orders, including in parallel. Moreover, steps other than those described may be included in certain implementations, or described steps may be omitted or combined, and not depart from the teachings herein. The use of the term "collecting" is not meant to be limiting and encompasses both actively collecting and receiving data.

The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A or B, X can include A alone, X can include B alone or X can include both A and B. In addition, the articles "a" and "an" as used in this application and the appended claims should generally be construed to mean "one or more" unless specified otherwise or clear from context to be directed to a singular form.

The above-described embodiments, implementations and aspects have been described in order to allow easy understanding of the present invention and do not limit the present invention. On the contrary, the invention is intended to cover various modifications and equivalent arrangements included within the scope of the appended claims, which scope is to be accorded the broadest interpretation so as to encompass all such modifications and equivalent structure as is permitted under the law.

Other embodiments or implementations may be within the scope of the following claims.

What is claimed is:

1. An active material layer for an electrode of a lithium ion battery comprising:
   a first active material comprising silicon-based particles;
   a second active material comprising graphite; and
   conduits each in physical contact at one end with the first active material and at an opposite end with the second active material, the conduits being conductive and of a material different from the first active material and the second active material, the first active material separated from the second active material by a length of a conduit during delithiation, the length of the conduit providing area for expansion of the first active material parallel to the length of the conduit and toward the second active material during lithiation while maintaining electrical contact between the first active material and the second active material.

2. The active material layer of claim 1, wherein the conduits are carbon nanotubes.

3. The active material layer of claim 2, wherein the carbon nanotubes are grown on the first active material and in contact with the second active material.

4. The active material layer of claim 2, wherein the carbon nanotubes are grown on the second active material and in contact with the first active material.

5. The active material layer of claim 2, wherein each carbon nanotube has a first diameter and each silicon-based particle has a second diameter, the first diameter being larger than the second diameter.

6. The active material layer of claim 5, wherein the first diameter is fifty nanometers or greater.

7. The active material layer of claim 2, wherein the carbon nanotubes have a length of up to thirty microns.

8. The active material layer of claim 1, wherein the conduits are conductive hollow metal wires of a material that is unreactive with lithium.

9. The active material layer of claim 8, wherein the conductive hollow metal wires are inserted into the first active material and are in contact with the second active material.

10. The active material layer of claim 8, wherein the conductive hollow metal wires are inserted into the second active material and are in contact with the first active material.

11. The active material layer of claim 8, wherein the conductive hollow metal wires have a first diameter and the silicon-based particles have a second diameter, the first diameter being larger than the second diameter.

12. The active material layer of claim 11, wherein the first diameter is fifty nanometers or greater.

13. An anode of a lithium ion battery comprising:
    a current collector;
    a separator; and
    the active material layer of claim 1.

14. The active material layer of claim 1, wherein the first active material further comprises one or more of tin and germanium.

* * * * *